(12) United States Patent
Hellerstein et al.

(10) Patent No.: US 6,996,551 B2
(45) Date of Patent: Feb. 7, 2006

(54) APPARATA, ARTICLES AND METHODS FOR DISCOVERING PARTIALLY PERIODIC EVENT PATTERNS

(75) Inventors: Joseph L. Hellerstein, Ossining, NY (US); Sheng Ma, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 09/739,432

(22) Filed: Dec. 18, 2000

(65) Prior Publication Data

US 2002/0107841 A1    Aug. 8, 2002

(51) Int. Cl.
*G06F 17/00* (2006.01)
*G06F 17/30* (2006.01)
*G06N 5/00* (2006.01)
*G06N 5/02* (2006.01)

(52) U.S. Cl. .................. 706/48; 706/45; 706/46; 707/6

(58) Field of Classification Search .................. 706/20, 706/48, 61, 25, 45; 702/187; 707/6; 713/502
See application file for complete search history.

(56) References Cited

U.S. PATENT DOCUMENTS

| | | | |
|---|---|---|---|
| 5,007,016 A * | 4/1991 | Le Mehaute et al. ........... 707/6 |
| 5,436,847 A * | 7/1995 | Schroer et al. ................ 702/76 |
| 5,471,631 A * | 11/1995 | Beardsley et al. .......... 713/502 |
| 5,493,688 A * | 2/1996 | Weingard ................... 382/157 |
| 5,504,841 A * | 4/1996 | Tani ........................... 700/246 |
| 5,675,712 A * | 10/1997 | Herault ........................ 706/20 |
| 5,675,786 A * | 10/1997 | McKee et al. .......... 707/103 R |
| 5,761,383 A * | 6/1998 | Engel et al. .................. 706/14 |
| 5,809,499 A * | 9/1998 | Wong et al. .................... 707/6 |
| 5,950,181 A * | 9/1999 | Federl ......................... 706/15 |
| 6,058,206 A * | 5/2000 | Kortge ....................... 382/159 |
| 6,236,982 B1 * | 5/2001 | Mahajan et al. .............. 706/45 |
| 6,374,242 B1 * | 4/2002 | Childs et al. ................... 707/6 |
| 6,385,609 B1 * | 5/2002 | Barshefsky et al. ........... 707/6 |
| 6,427,141 B1 * | 7/2002 | Barnhill ....................... 706/16 |

(Continued)

FOREIGN PATENT DOCUMENTS

WO    WO 200120918 A2 *   3/2001

OTHER PUBLICATIONS

J. Yang, W. Wang and P.S. Yu, "Mining Asynchronous Periodic Patterns in Time Series Data", Proceedings of the sixth ACM SIGKDD international conference on Knowledge discovery and data mining Aug. 2000, pp. 275-279.□□.*

(Continued)

*Primary Examiner*—Wilbert L. Starks, Jr.
*Assistant Examiner*—Meltin Bell
(74) *Attorney, Agent, or Firm*—Ryan, Mason & Lewis, LLP

(57) ABSTRACT

Apparata, articles and methods for discovering partially periodic temporal associations, referred to herein as p-patterns, are provided. For example, a p-pattern in computer networks might comprise five repetitions every 30 seconds of a port-down event followed by a port-up event, which in turn is followed by a random gap until the next five repetitions of these events. In one embodiment, the present invention comprises: (i) a normalization step to convert application-oriented event data into an application-independent normalized table; (ii) an algorithm for finding significant period lengths from normalized events (e.g., 30 seconds) using a Chi-squared test; and (iii) an algorithm for finding a partially periodic temporal association (e.g., port-down followed by port-up) given a known period.

21 Claims, 13 Drawing Sheets

U.S. PATENT DOCUMENTS

| | | | |
|---|---|---|---|
| 6,507,843 B1 * | 1/2003 | Dong et al. | 707/6 |
| 6,532,456 B1 * | 3/2003 | Wang et al. | 706/48 |
| 6,629,095 B1 * | 9/2003 | Wagstaff et al. | 707/5 |
| 6,675,164 B2 * | 1/2004 | Kamath et al. | 707/6 |
| 6,687,694 B2 * | 2/2004 | Miller | 707/6 |
| 6,697,802 B2 * | 2/2004 | Ma et al. | 707/6 |
| 6,718,317 B1 * | 4/2004 | Wang et al. | 706/50 |
| 6,785,663 B2 * | 8/2004 | Wang et al. | 706/45 |
| 6,829,608 B2 * | 12/2004 | Ma et al. | 707/6 |
| 6,917,940 B1 * | 7/2005 | Chen et al. | 707/10 |
| 6,920,440 B1 * | 7/2005 | Barson | 706/21 |
| 2002/0087495 A1 * | 7/2002 | Wang et al. | 706/45 |
| 2005/0149577 A1 * | 7/2005 | Okada et al. | 707/200 |
| 2005/0154723 A1 * | 7/2005 | Liang | 707/3 |

OTHER PUBLICATIONS

Wen-Chi Hou, "A Framework for Statistical Data Mining with Summary Tables", Scientific and Statistical Database Management, 1999. Eleventh International☐☐Conference on, Jul. 28-30, 1999 pp. 14-23☐☐.*

Yang et al, "Mining Asynchronous Periodic Patterns in Time Series Data", Proceedings of the sixth ACM SIGKDD international conference on Knowledge discovery and data mining Aug. 2000, pp. 275-279.*

Ross; Introduction to Probability and Statistics for Engineers and Scientists; 1987; pp viii-ix, xi-xv, 117-120, 204-237, 254-260, 263-264, 338-372, 461-462, 481, 483.*

Lancaster; The Chi-Squared Distribution; 1969; pp vii-xv, 18-22, 32-33, 36-38, 117-125, 135-154, 161-178, 203, 217-219, 337, 343-347.*

Desoer et al; Robust Stability under additive perturbations; IEEE Transactions on Automatic Control; vol. 30, Is. 12; Dec. 1985; pp 1233-1234.*

Schmidt; Using design patterns to develop reusable object-oriented communication software; Communications of the ACM; vol. 38, Is. 10; Oct. 1995; pp 65-74.*

Saksena et al; Automatic synthesis of multi-tasking implementations from real-time object-oriented models; Third IEEE International Symposium on Object-Oriented Real-Time Distributed Computing Proceedings; Mar. 15-17, 2000; pp 360-367.*

Wen-Chi Hou, "A Framework for Statistical Data Mining with Summary Tables", Scientific and Statistical Database Management, 1999. Eleventh International☐☐Conference on, Jul. 28-30, 1999,pp. 14-23☐☐.*

B. Ozden et al., "Cyclic Association Rules," Int. Conf. Data Engineering, 1998, pp 4-40.

R. Cooley et al., "Web Mining: Information and Pattern Discovery on the World Wide Web," Proceedings of the 9th IEEE International Conference on Tools with Artificial Intelligence (ICTAI'97), 10 pages, 1997.

H. Mannila et al., "Discovery of Frequent Episodes in Event Sequences," Data Mining and Knowledge Discovery, 1(3), pp. 1-45, 1997.

R. Srikant et al., "Mining Sequential Patterns: Generalizations and Performance Improvements," Proc. of the Fifth Int'l Conference on Extending Database Technology (EDBT), Avignon, France, 15 pages, 1996.

R. Agrawal et al., "Mining Association Rules Between Sets of Items in Large Databases," Proc. of VLDB, pp. 207-216, 10 pages, 1993.

J. Han et al., "Efficient Mining of Partial Periodic Patterns in Time Series Database," 10 pages, 999.

* cited by examiner

FIG. 7 (FIG. 5, ITEM 510, TRANSFORM TO EVENT CLASSES)

FIG. 11 (FIG. 5, ITEM 530, FORMULATE QUALIFIED PARTIAL PATTERNS)

FIG. 12 (FIG. 11, ITEM 1130, MERGE INTO LARGE PATTERNS)

APPARATA, ARTICLES AND METHODS FOR DISCOVERING PARTIALLY PERIODIC EVENT PATTERNS

FIELD OF THE INVENTION

The present invention relates generally to event data processing techniques and, more particularly, to methods and apparatus for discovering partially periodic event patterns in event data.

BACKGROUND OF THE INVENTION

Event data (or logs) is widely available in many application domains, such as systems management, process control, and manufacturing. For example, in systems management, which typically relates to the management of distributed computing and/or communication networks, events are generated from a variety of sources, such as network devices, application servers, and system management software. Event logs often record important temporal activities that provide important information resources. As one example, a network device uses a log file to record its important status changes, such as "cold start," "port up/down," "link up/down." The device log file can be used for problem diagnosis and determination. As another example, an application server, such as web servers, mail servers, and DNS (domain name system) servers, usually maintains a service access log recording client access activities. These log files provide a basis for understanding server workload and client access behaviors. As the third example, system management software, such as Netview (available from IBM Corporation) and TEC (available from Tivoli), keep track of all messages sent by managed nodes in either a database or a log file. These system events are crucial for maintaining the normal operations of a system.

Temporal, periodic behavior is common in event data. This is discussed in B. Ozden et al., "Cyclic association rules," Int. Conf. Data Engineering, pp. 412–421, 1998; and J. Han et al., "Efficient mining of partially periodic patterns in time series database," Int. Conf. Data Engineering, 1999, the disclosures of which are incorporated by reference herein. For example, our study of event logs in a production computer network found that over 50% of the events can be explained by periodic temporal patterns. An example periodic temporal pattern in computer networks might consist of five repetitions every 30 seconds of a port-down event followed by a port-up event, which in turn is followed by a random gap until the next five repetitions of these events. Two factors contribute to this phenomenon. The first consideration relates to monitoring. When a managed element emits a high severity event, the management server often initiates periodic monitoring of key resources, e.g., router central processing unit (CPU) utilization. The second consideration is a consequence of routine tasks, such as rebooting print servers every morning or backing up data every week.

Mining such periodic patterns can provide great value. Our experience with analyzing events in computer networks is that periodic patterns often lead to actionable insights. There are two reasons for this conclusion. First, a periodic pattern indicates something persistent and predictable. Thus, there is value in identifying and characterizing the periodicity. Second, the period itself often provides a signature of the underlying phenomena, thereby facilitating diagnosis. In either case, patterns with a very low support (number of occurrences in the data) are often of great interest. For example, we found a one-day periodic pattern due to a periodic port-scan. Although this pattern only happens three times in a three-day log, it provides a strong indication of a security intrusion.

Unfortunately, mining such periodic patterns is complicated by several factors.

(1) Periodic behavior is not necessarily persistent. For example, in complex networks, periodic monitoring is initiated when an exception occurs (e.g., CPU utilization exceeds a threshold) and stops once the exceptional situation is no longer present. During the monitoring interval or "on" segment, the monitoring request and its response occur periodically. The "off" segment consists of a random gap in the periodicity until another exceptional situation initiates periodic monitoring. This makes it difficult to apply well established techniques such as fast Fourier transforms.

(2) There may be time shifts or imprecisions due to network delays, lack of clock synchronization, and rounding errors.

(3) Period lengths are not known in advance. This means that either an exhaustive search is required or there must be a way to infer the periods. Further, periods may span a wide range, from milliseconds to days.

(4) The number of occurrences of a periodic pattern typically depends on the period. For example, a pattern with a period of one day has, at most, seven occurrences in a week, while one minute period may have as many as 1440 occurrences. Thus, mining patterns with longer periods requires adjusting support levels. In particular, mining patterns with low support greatly increases computational requirements in existing approaches to discovering temporal associations.

Existing work does not address key characteristics of these patterns, especially: the presence of noise, time shifts, the fact that periods may not be known in advance, and the need to have computationally efficient schemes for finding large patterns with low support. This invention develops effective, yet scaleable algorithms for mining such patterns that take these considerations into account.

Sequential mining has been studied extensively, especially in domains such as event correlation in telecommunication networks (see, e.g., H. Mannila et al., "Discovery of frequent episodes in event sequences," Data Mining and Knowledge Discovery, 1(3), 1997, the disclosure of which is incorporated by reference herein), web log analysis (see, e.g., R. Cooley et al, "Web mining: Information and pattern discovery on the world wide web," Proceedings of the 9th IEEE International Conference on Tools with Artificial Intelligence (ICTAI'97), 1997, the disclosure of which is incorporated by reference herein), and transactions processing (see, e.g., R. Agrawal et al., "Mining association rules between sets of items in large databases," Proc. of VLDB, pp. 207–216, 1993; and R. Srikant et al., "Mining sequential patterns: Generalizations and performance improvements," Proc. of the Fifth Int'l Conference on Extending Database Technology (EDBT), Avignon, France, 1996, the disclosures of which are incorporated by reference herein). One theme with respect to this existing work is to discover frequent temporal associations, i.e., finding a set of events that co-occur within a predefined time window. However, these existing approaches can not be used directly for finding periodic patterns.

There has also been recent work in identifying periodic behaviors, see, e.g., the above-referenced J. Han et al. article and the B. Ozden et al. article. Ozden et al. study mining of cyclic association rules for full periodicities, i.e., patterns that are present at each cycle. As noted earlier, this is quite restrictive since periodicity may occur only intermittently. Han et al. studies partially periodic patterns. Han et al. defines partially periodic patterns for sequence data through non-overlapped segmentations of sequences. Their focus is symbol (or discrete) sequences, not time-based sequences. Further, they assume that period lengths are known in advance or that it is reasonable to employ an exhaustive search to find the periods. The invention makes neither assumption. In addition, none of these studies consider the effect of noise, i.e., random occurrences of events of the same type as those in the periodic pattern. Nor do these studies address the problem of time shifts or imperfections in the periodicity.

The fast Fourier transform (FFT) is a well developed technique for identifying periods. However, there are two problems with the use of this technique. First, while the FFT is effective for finding a wide range of periods, it does not cope well with random off-segments in partially periodic patterns as will be explained in accordance with the present invention. Further, the computational efficiency of FFT depends on the range of time scales. The computational complexity of FFT is O(T log T), where T is the number of time units. This is undesirable for sparse events with periodicities over a wide range of time-scales, which is often the case in network management. For example, although there may be hundreds of thousands of events in a month, there are over one billion milliseconds.

Accordingly, there is a need for techniques for discovering partially periodic event patterns which take into account one or more of the following: (i) the presence of noise; (ii) time shifts or imprecisions; (iii) the fact that periods may not be known in advance; and (iv) the need to have computationally efficient schemes for finding large patterns with low support, as well as other considerations.

SUMMARY OF THE INVENTION

The present invention provides methods and apparatus for automatically discovering partially periodic patterns in event data. Such partially periodic pattern discovery yields significant benefits in the application domain in which the event data is generated by providing important information resources and yielding actionable insights.

As will be evident herein, the present invention adopts a broader definition of periodicity than is applied by the existing art in order to capture a broader range of event patterns. Specifically, the present invention employs the concept of a "partially periodic temporal association," which we refer to herein as a "p-pattern," to account for, among other things, the concepts of partial periodicity and time shifts or imprecisions. Advantageously, a p-pattern according to the invention generalizes the concept of partial periodicity defined in the above-referenced J. Han et al. article by incorporating temporal associations and including the concept of time tolerance to account for imperfections in the periodicities. As mentioned above, Han et al. defines a partial periodic pattern for sequence data through non-overlapped segmentations of sequences; while the present invention introduces the "on-off" periodic model, as will be explained, and preferably defines the partial periodicity for temporal event data by sliding time windows and considering time imprecision. Further, the present invention provides techniques for discovering partially periodic patterns with unknown periods in the presence of noise. Thus, the invention provides techniques for searching for patterns in the event data that conform with this broader definition of partially periodicity.

Accordingly, in one illustrative aspect of the invention, a method of discovering one or more partially periodic patterns in event data comprises the steps of: (i) transforming the event data; (ii) finding period lengths in the event data; and (iii) finding temporal associations in accordance with the period lengths of the event data. In particular embodiments, the present invention provides an algorithm for finding period lengths based on a Chi-squared test and provides a level-wise algorithm for finding temporal associations.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described below in the context of an exemplary event data generating application domain, namely, systems management. However, it is to be understood that the invention is not limited to use with any particular application domain but is rather more generally applicable for use in accordance with any application domain (e.g., systems management, process control, manufacturing, to name a few examples) in which it is desirable to provide a determination of partially periodic patterns in event data, generated in accordance with the application domain, which takes into account one or more of the following: (i) the presence of noise; (ii) time shifts or imprecisions; (iii) the fact that periods may not be known in advance; and (iv) the need to have computationally efficient schemes for finding large patterns with low support, as well as other considerations that will be evident.

The remainder of the detailed description is organized in the following manner. First, examples are provided to illustrate the concepts of p-patterns according to the present invention. Second, a detailed description of a system for mining p-patterns according to an embodiment of the invention is provided. Third, a detailed description of algorithms used in mining p-patterns according to an embodiment of the invention is provided.

As mentioned, the present invention provides methods and apparatus for automatically discovering partially periodic patterns or p-patterns in event data. We illustrate the concept of p-patterns through some examples in the context of FIGS. 1 and 2.

Figure 1:
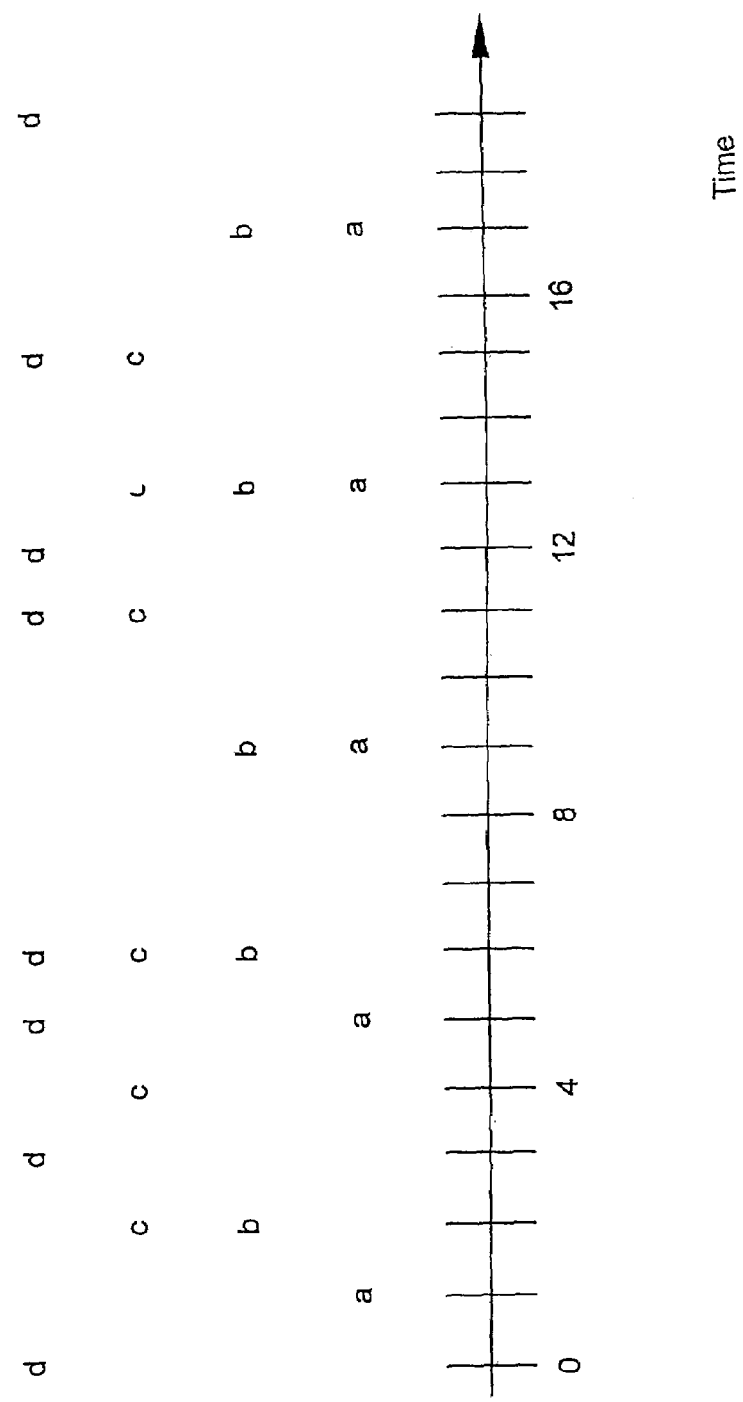
FIG. 1 is a diagram illustrating an event sequence.
Figure 2:
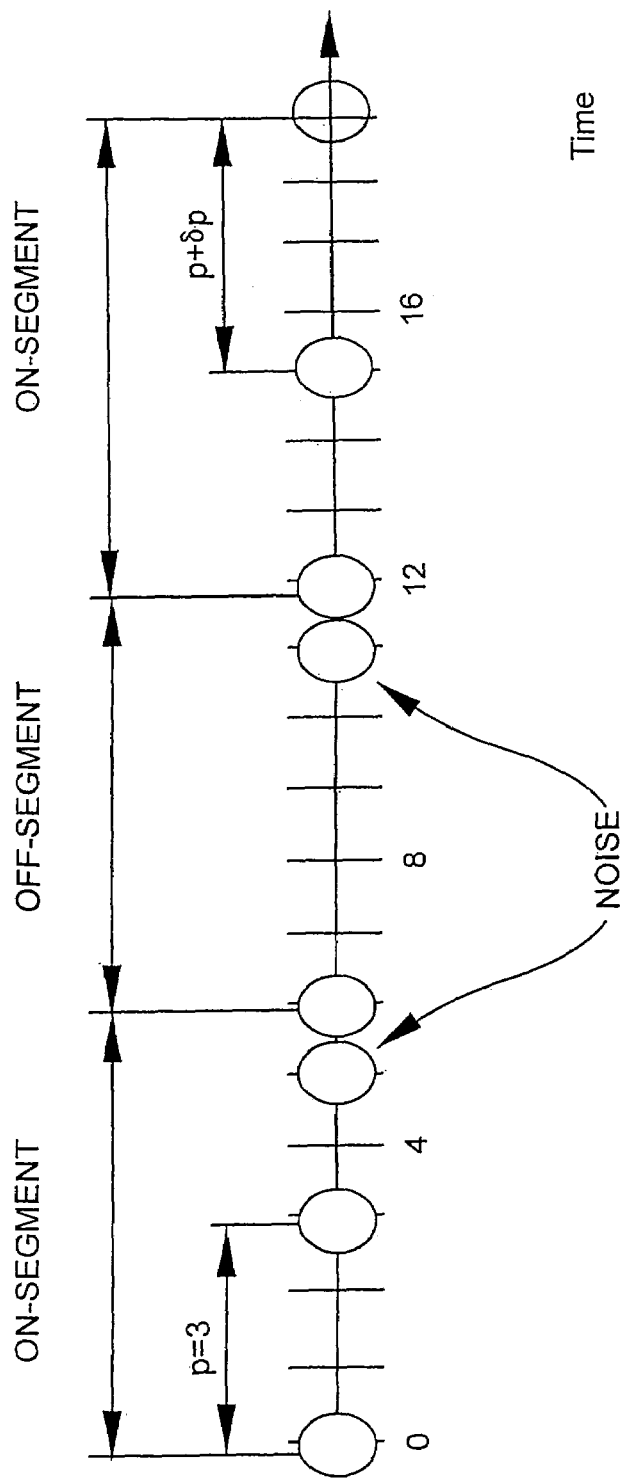
FIG. 2 is a diagram illustrating a point process and on-off segments.

FIG. 1 shows an illustrative event sequence in which the set of event types is A={a, b, c, d}. The type of an event is labeled above its occurrence time. An event sequence can be viewed as a mixture of multiple point sequences, where a "point" corresponds to an occurrence of an event type. This example has four point sequences. The point sequence of event type "a" is $S_a$=(1, 5, 9, 13, 17); of event type "b" is $S_b$=(2, 6, 9, 13, 17); of event type "c" is $S_c$=(2, 4, 6, 11, 13, 15); and of event type "d" is $S_d$=(0, 3, 5, 6, 11, 12, 15, 19). FIG. 2 illustrates the point sequence of event type "d." A point is plotted as an "o" (i.e., circle) at its occurrence time on the time axis. Thus, the symbol "o" represents an occurrence of event type "d" on the time axis. Using this example in FIGS. 1 and 2, we illustrate the definition of periodicity with time tolerance, partial periodicity, and a partially periodic event pattern.

It is to be appreciated that an event type may have a complex structure. For example, in a systems management example of an Internet Protocol (IP) network, we can encode host name and alarm type into event type and so a "port down" alarm sent from host X has a different event type than a "port down" alarm sent from host Y.

In the event sequence of FIG. 1, event type "a" occurs at times (1, 5, 9, 13, 17), and thus is periodic with a period of 4 time units, as "a" happens exactly every 4 time units. Event type "b" occurs at times (2, 6, 9, 13, 17). Event type "b" repeats almost every 4 time units except that the time interval is 3 between the second and the third "b". Thus, we say "b" is "periodic with a time tolerance δ of 1." Time tolerance relaxes the definition of periodicity, and allows an inaccurate period up to the time tolerance. Thus, event type "b" is not periodic in a strict sense, and thus we qualify its periodicity with a tolerance of 1. Again, as can be seen, this is because "b" repeats either every 3 time units or every 4 time units.

Full or complete periodicity requires periodic behavior in the whole time duration. However, this is very stringent and cannot capture situations where events may be lost and where a periodic behavior only persists in parts of the whole time duration. Thus, we employ a generalization we refer to as partial periodicity. A partially periodic point sequence is illustrated in FIG. 2. As shown, we consider a point sequence that alternates between on-segments and off-segments. During the "on-segment," the point sequence is periodic with period p. Then, there is a random gap, or "off-segment," during which the point sequence is not periodic with period p. For another example, we refer to FIG. 1 where "c" occurs periodically during time windows [2, 6] and [11, 15], as explained above, where the notation [x, y] defines a time window between time x and time y. Clearly, event type "c" is not fully periodic like event type "a". We say "c" is partially periodic in parts of the whole time range.

Thus far, we have described the partial periodicities of an individual event. This can be further generalized to a set of events that occur close in time called a "time window."

A set of event types $A_1 \subset A$ is a "partially periodic temporal association" or p-pattern with parameters p (for period length), δ (for time tolerance of period length), w (for time window defining temporal association), and minsup (for the minimum support for a p-pattern), if the number of qualified instances of $A_1$ in D exceeds the support threshold minsup. A qualified instance $S_1 \subset D$ satisfies the following two conditions:

(1) The set of the event types of events in $S_1$ is $A_1$, and there is a t such that for all $e_i \in S_1$, $t \leq t_i \leq t+w$.

(2) The point sequences for each event type in $S_1$ occur partially periodically with the parameters p and δ.

To illustrate this definition, we refer again to FIG. 1. Let time window w=1, time tolerance δ=1, and minsup=2. Then, {a, b} is a p-pattern with length 2 and period 4. Moreover, all non-null subsets of this pattern—{a}, {b}—are also p-patterns with length 2.

It can easily be verified that p-patterns are downward closed. That is, if $A_1$ is a p-pattern, then all non-null subsets of $A_1$ are also p-patterns. This means that a level-wise search, as will be explained below, can be used, thereby providing computational efficiencies.

As will be illustrated below, the present invention provides a methodology for discovering the aforementioned p-patterns. In one illustrative embodiment, the methodology comprises three main steps: (i) transformation of event data or event logs; (ii) finding possible period lengths; and (iii) finding temporal associations.

The first step normalizes event logs. An event log can be viewed as a table, in which a row is corresponding to an event, and a column is corresponding to an attribute of events. A log may have multiple attributes depending on a specific application. For example, a system event log usually has a host name attribute representing the source of an event, an alarm type attribute indicating what the event is about, and a time attribute indicating when this event happens. It may also have other attributes such as severity level, status, etc. A web access log has a different set of attributes including, for example: a client identifier, a page to be retrieved, client browser type, time-stamp, bytes to be retrieved, etc. As the number of attributes and their meanings are application-dependent, we employ the normalization step so as to deal with different applications. The normalization step maps (or encodes) all event attributes except the time attribute into a new attribute called an event group ID (identifier). Consequently, the output of the normalization step is a table with three columns: time stamp, event ID, and event group ID. This normalized table is independent of applications.

The second step aims to find all possible period lengths. In accordance with the invention, an algorithm is provided for performing this task and is designed to effectively deal with three issues: (i) random off-segments; (ii) a possible time shift; and (iii) possible noise events. In addition, the algorithm scales linearly with respect to the number of events. One key idea of our algorithm is to explore the statistics of the inter-arrival time between two adjacent events. This situation is best described with an example. Consider again event type "d" in FIG. 2. This event type has a period of 3 starting at time 0 and extending through time 19. However, there are also two noisy "d" events at times 5 and 11. Thus, the set of inter-arrival times are {3, 2, 1, 5, 1, 3, 4}. By counting, we get 2 instances for inter-arrival time 3, 2 instances for inter-arrival time 1, and 1 instance for inter-arrival times 4, 5 and 2, respectively. Intuitively, a low count may be due to either noise (i.e., noisy events) or off-segments. Therefore, we can set up a threshold and look for inter-arrival times with a count equal to and greater than the threshold (or just greater than). In this example, if the threshold is set to be 2, then we may pick out two possible period lengths 1 and 3 as their instance counts are 2 and 3, respectively. While inter-arrival times 5 and 2 are filtered out. This algorithm is very simple, however, it favors small periods. Intuitively, the number of periodic points with a large period length is much smaller than that with a small period. For example, the number of possible instances is only 3 for a 1-day p-pattern in 3-day events, while it is 4320 for a 1-mintue p-pattern. To address this situation, we provide an algorithm based on a Chi-squared test. The algorithm intuitively employs varied thresholds which are larger for a smaller period length based on a statistical test. Thus, advantageously, the present invention also takes into account noise (e.g., as represented by points at times 5 and 11 in FIG. 2) in determining partially periodic patterns.

The third step of the methodology is to merge related (temporal associated) events together and find a large pattern for each period found in the second step. A variation of a level-wise search is provided. One example of a level-wise search that may be varied according to the invention is described in R. Cooley "Web mining: Information and pattern discovery on the world wide web," Proceedings of the 9th IEEE International Conference on Tools with Artificial Intelligence (ICTAI'97), 1997, the disclosure of which is incorporated by reference herein.

A basic level-wise algorithm according to the invention works as follows. The algorithm starts with a p-pattern of length 1. The algorithm iteratively forms a candidate set for p-patterns of level (length) k based on p-patterns of level k−1, counts occurrences of each p-pattern in the candidate set, and then finds qualified p-patterns of level k whose support (i.e., the number of its occurrences in given data) exceeds a threshold minsup. To boost the performance, we note that all events in a p-pattern should be periodic with the same period length. To illustrate this, we refer again to FIG. 1. where {a, b} is a p-pattern with length 4. This implies that both "a" and "b" are partially periodic with the same period length 4. Using this property, we can group events that have the same period length, and then speed up the algorithm in two ways. First, we can filter out unrelated events that do not have the same period. This reduces counting time of the algorithm. Second, we can focus on this group of events when candidates are generated. This reduces the candidate space of the algorithm. Another advantage of our algorithm is that the minimum support and the window size can be assigned separately for each period based on the period length and its support. This makes it possible to find a pattern with a very low support because of a large period p, while avoiding a drastic increase of the search space.

Now, we discuss an illustrative system for mining p-patterns in accordance with the principles of the invention described above. We start with a generic mining system.

Figure 3:
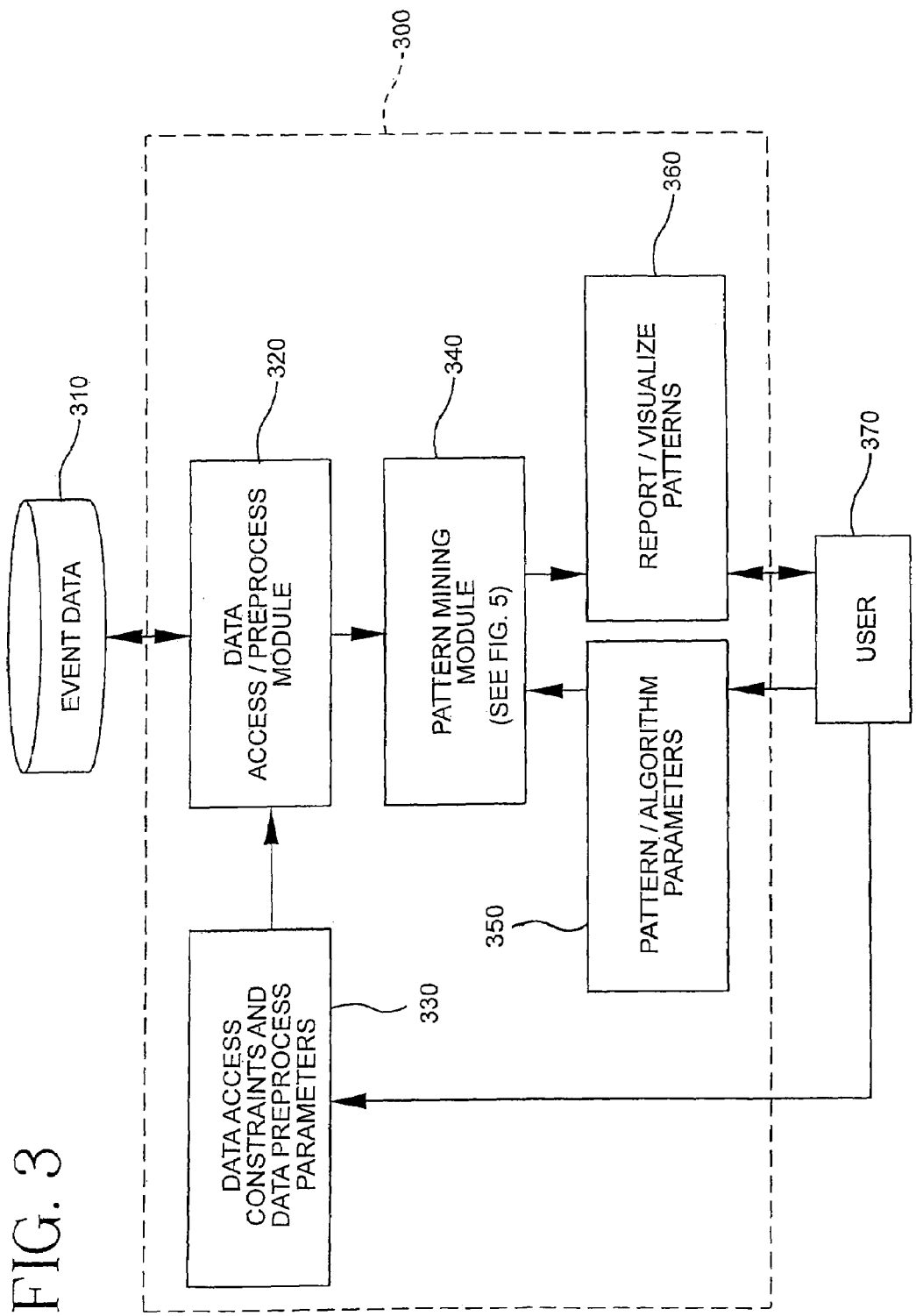
FIG. 3 is a block diagram illustrating a system for mining partially periodic patterns according to an embodiment of the present invention.

Referring now to FIG. 3, a block diagram illustrates a system 300 for mining or discovering partially periodic patterns or p-patterns, as well as other patterns, according to an embodiment of the present invention. As shown, the system includes a data access/preprocess module 320 and a pattern mining module 340, as well as data access constraints and data preprocess parameters 330, pattern/algorithm parameters 350 and report/visualize patterns 360. Event data 310 is input to the system and may be stored in either flat files or a database. The data access/preprocess module 320 provides basic functions to access and preprocess the event data so as to prepare and load the event data for mining. Data access functions may include SQL-like (Standard Query Language-like) operations based on user-provided constraints input and stored via interface module 330, as well as typical file access functions. Through interface module 330, a user 370 is able to define attributes (e.g., columns) and events (e.g., rows) that are of interest. Such data access constraints and data preprocess parameters are used to perform access/preprocessing functions on the event data in module 320. Preprocessing functions may include data format transformation (e.g., converting raw textual fields into structured fields), attribute mapping functions (e.g., mapping string name into ID), filling in missing data fields, filtering out unwanted records based on constraints (from module 330), etc. It should be noted that it is not necessary to load event data into the main memory of the computer system executing the data access/preprocessing functions. Rather, the data access module 320 preferably provides functions supporting data scan. Such functions may include: (i) get the first (qualified) record; and (ii) get the next record. It may also cache events for a specified time window. These basic data access functions will be used by mining algorithms for scanning the data.

Once proper event data has been defined in accordance with module 320, the pattern mining module 340 processes event data and produces patterns. A p-pattern is one type of pattern that may be of interest to an end-user. Other frequently referred patterns that may be mined by module 340 include, for example, temporal associations (as described in R. Srikant et al., "Mining sequential patterns: Generalizations and performance improvements," Proc. of the Fifth Int'l Conference on Extending Database Technology (EDBT), Avignon, France, 1996, the disclosure of which is incorporated by reference herein) and frequent episodes (as described in H. Mannila et al., "Discovery of frequent episodes in event sequences," Data Mining and Knowledge Discovery, 1(3), 1997, the disclosure of which is incorporated by reference herein). Of course, other patterns may be discovered by the system 300.

It is to be appreciated that the user 370 controls the mining process in three ways. First, the user can control the set of event data that will be mined through defining data access/preprocessing constraints (entered at interface module 330). Second, the user may define the type of patterns (e.g., p-pattern) to be mined, and determine a mining algorithm to be used and its parameters, including significance scores. Such pattern/algorithm parameters are entered by the user at the interface module 350. Third, the user may determine what kind of patterns are of interest based on specifying interest scores, and interactively view/select patterns that are of interest. Interface module 360 provides an interactive mechanism for a user to exam p-patterns and/or other patterns found. Reporting and visualization of the patterns found can be done in many ways. For example, a view list can be used to list p-patterns found, while a tree view can be used to provide the hierarchical presentation. Visualization techniques can also be used to help a user to understand p-patterns. It is to be appreciated that the present invention is not intended to be limited to any particular reporting and visualization techniques, but rather focuses on pattern mining techniques. Thus, any suitable reporting and visualization techniques may be employed in accordance with module 360.

Figure 4:
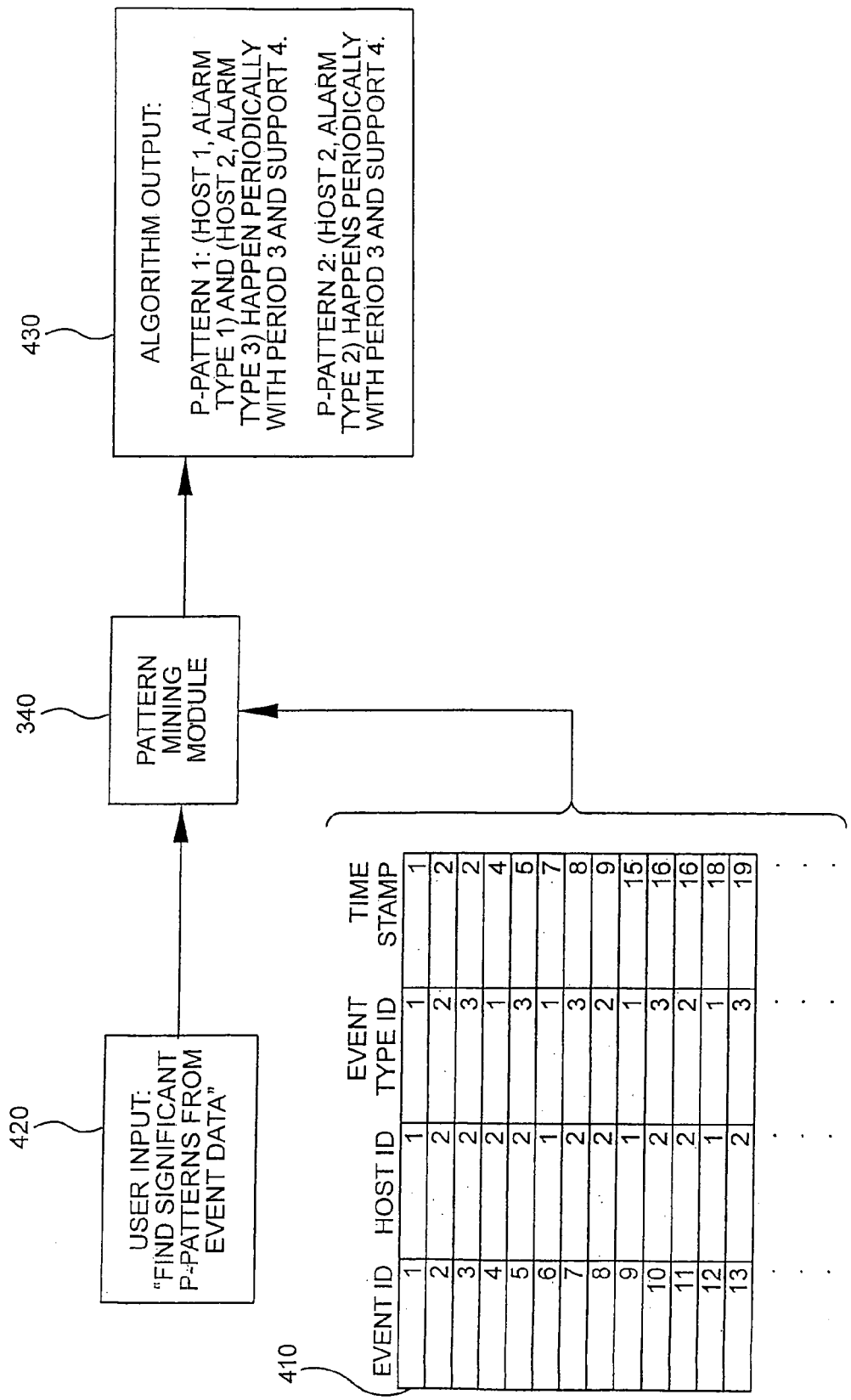
FIG. 4 is a diagram illustrating an example of inputs and outputs associated with the pattern mining module 340 in FIG. 3.

Referring now to FIG. 4, a diagram illustrates an example of inputs and outputs associated with the pattern mining module 340 in FIG. 3. One input is an event table 420. As explained above, the event table may be generated in accordance with the data access/preprocessing module 320. As shown in FIG. 4, each row of the table is an event. Each column of the table is an attribute of an event. This example has four columns. They are: (i) event ID, which is the unique identifier for an event; (ii) host ID, which identifies the originator of an event; (iii) event type ID, which indicates a problem type; and (iv) time stamp, which indicates the occurrence time of an event. We note that the number of columns and their meanings depend on a specific application and, therefore, the invention is not intended to be limited to any specific format. The other input shown in FIG. 4 is the user input command: "Find significant p-patterns from the event data." Not expressly shown, but intended to be implicitly represented in the user command, are the specific user inputs described above in the context of interface modules 330 (data access constraints and data preprocess parameters), 350 (pattern/algorithm parameters), and 360 (report/visualize patterns).

The inputs 410 and 420 are processed by the pattern mining module 340 and yield output 430 in the form of one or more discovered p-patterns. Two p-patterns can be found in this example. The first p-pattern is read as "p-pattern 1: (host 1, alarm type 1) and (host 2, alarm type 3) happen periodically with period 3 and support 4" in FIG. 4. A p-pattern is preferably described by three pieces of information. The first piece of information is the set of events in a p-pattern. P-pattern 1 has two events: (host 1, alarm type 1) read as event from host 1 with alarm type 1, and (host 2, alarm type 3) read as event from host 2 with alarm type 3. The second piece of information is the period length of the p-pattern. The period length of p-pattern 1 is 3. The third piece of information is a significance index of the p-pattern. We use support, i.e., the number of occurrences of the p-patterns, to indicate the significance index. P-pattern 1 reoccurs 4 times, thus, having support 4. We note that other significance indices can be used including statistical test, confidence level, predictive power, etc.

Figure 5:
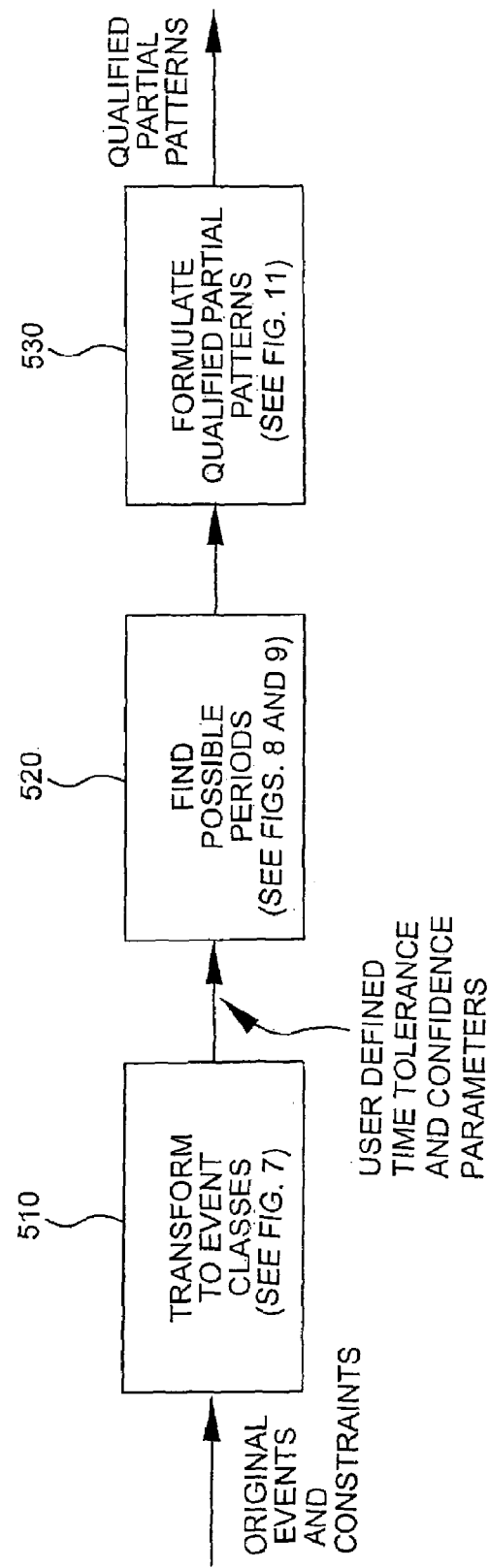
FIG. 5 is a flow diagram illustrating a pattern mining methodology according to an embodiment of the present invention.

FIG. 5 is a flow diagram illustrating a pattern mining methodology according to an embodiment of the present invention. Specifically, FIG. 5 shows a methodology 500 that may be employed by the pattern mining module 340 (FIG. 3). In accordance with this embodiment, discovering p-patterns is accomplished in three steps: (i) transforming an event table (item 510); (ii) finding period lengths for each event class (item 520); and (iii) finding patterns (item 530). The first step (item 510) transforms an application-dependent table into a normalized, application-independent table. This will be further described in the context of FIGS. 6 and 7. The second step (item 520) of finding period lengths will be further described in the context of FIGS. 8–10. The last step (item 530) of constructing patterns will be further described in the context of FIGS. 11 and 12.

Figure 6:
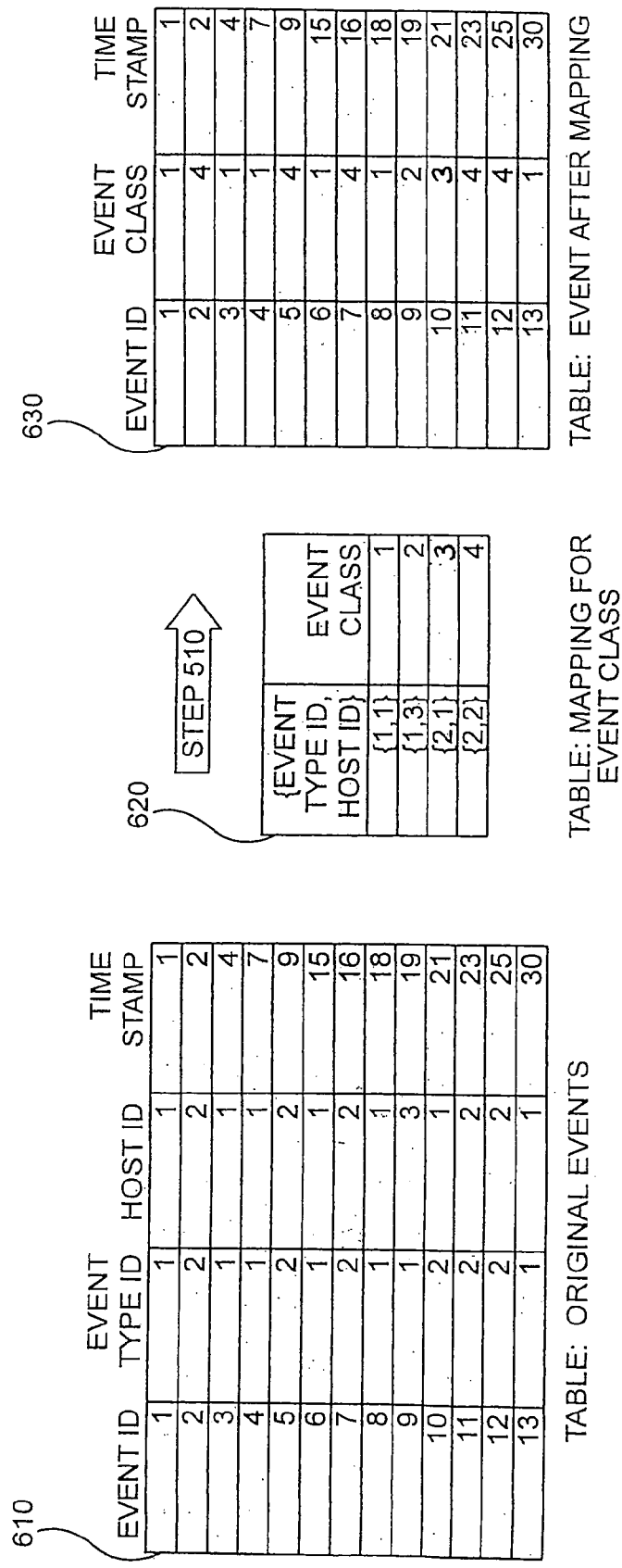
FIG. 6 describes a data transformation operation (item 510 of FIG. 5) of a working example.

FIG. 6 describes the data transformation operation (item 510 of FIG. 5) of our working example. The input of the working example is a table 610 with four attributes: event ID, event type ID, Host ID, and time stamp. The output is a normalized table 630 containing only three columns. Among them, event ID (column 1) and the time stamp (column 3) are directly copied from the input table. The event class ID (column 2) encodes the rest of the attributes of an event. In this example, the event class ID encodes or maps the pair of source name (host ID) and alarm type (event type ID) based on a lookup table 620 built by the algorithm to be described in the context of FIG. 7. The lookup table 620 defines mapping rules. For example, the first entry of the lookup table maps events generated by host 1 with alarm type 1 into event class 1. Through this step, an application-independent table is obtained.

Figure 7:
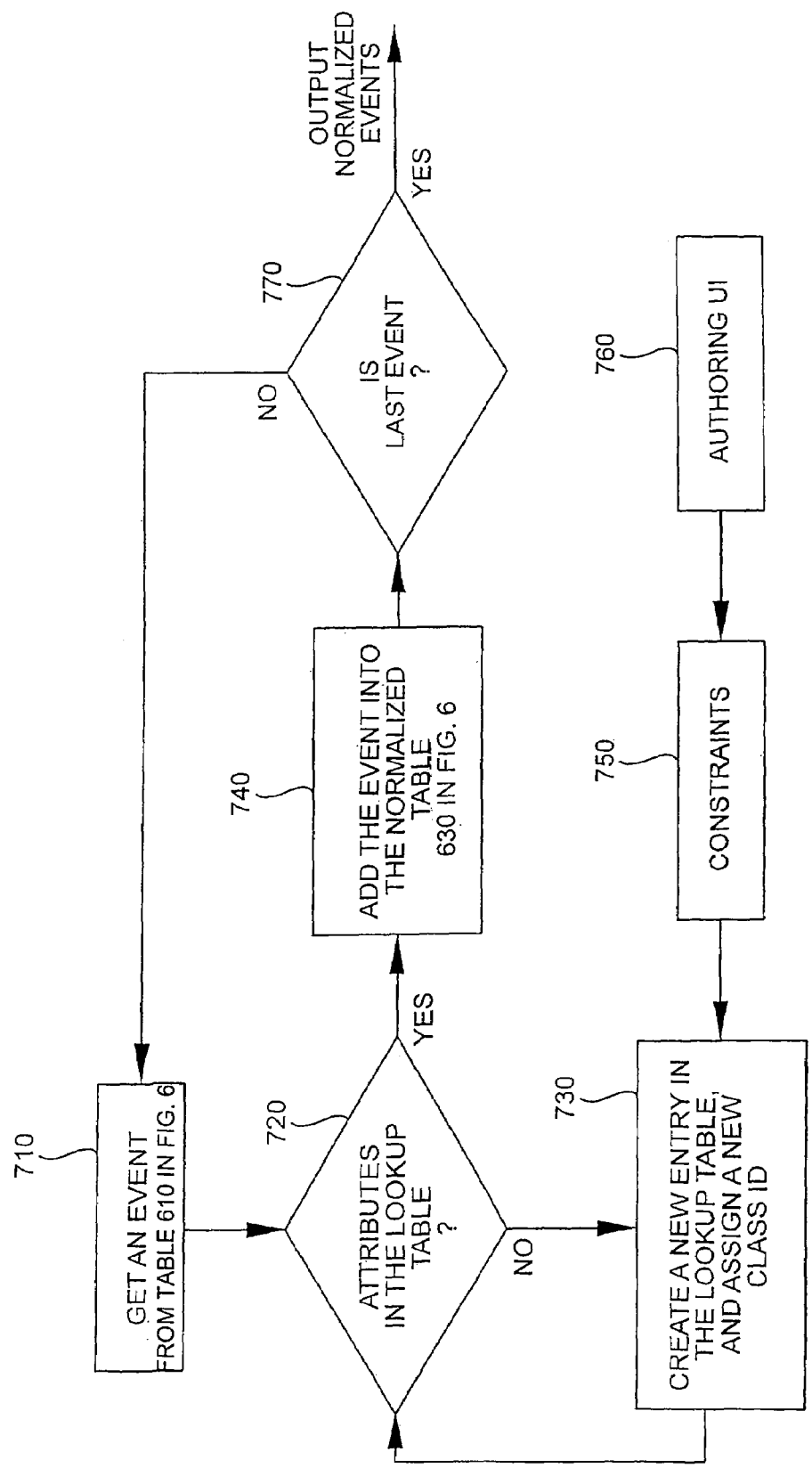
FIG. 7 is a flow diagram illustrating details of an algorithm for transforming events according to an embodiment of the present invention.
Figure 8:
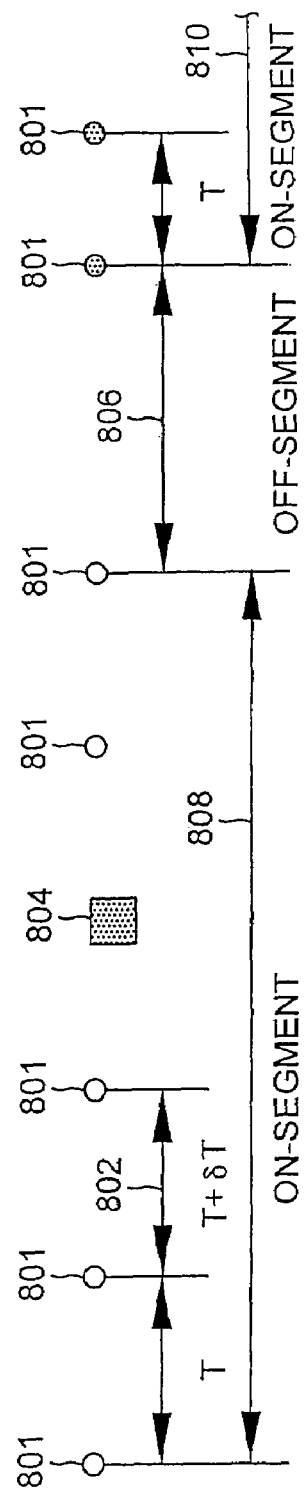
FIG. 8 is a diagram illustrating events for an event class as a point sequence in accordance with the present invention.

FIG. 7 is a flow diagram illustrating details of an algorithm for transforming events according to an embodiment of the present invention. Specifically, FIG. 7 shows a methodology for performing item 510 of FIG. 5. The algorithm builds a lookup table (e.g., table 620 of FIG. 6), whose key is attributes of an event, and whose content is the event class ID. This lookup table may be initially empty. The algorithm works as follows. In item 710, an event is retrieved from the input table (e.g., table 610 of FIG. 6). In item 720, a check is performed to determine whether the attributes of the event are in the lookup table. If the attributes are not in the lookup table, item 730 adds a new mapping entry into the lookup table with the attributes as the key, and the next unused event class ID as its content. If the attributes are found in the lookup table, the event is transformed and added into the normalized event table (e.g., table 630 of FIG. 6) in item 740. A determination is made in item 770 as to whether all events have been processed. If not all events are processed, the algorithm goes back to item 710 and the process repeats itself. A user can specify constraints (block 750) for the mapping in accordance with a user interface authoring item 760. For example, if a user wants to map "port up" and "link up" alarms into one event class, the user can do so by adding two keys in the lookup table with the same event class ID as its content, Now, we describe an algorithm for finding possible periods for each event class, i.e., item 520 of FIG. 5. Referring now to FIG. 8, a diagram illustrates events 801 for an event class as a point sequence. This example shows a time shift 802, a missing event 804, an off-segment 806, and on-segments 808 and 810. Given such a point sequence, we want to find all possible period lengths.

Figure 9:
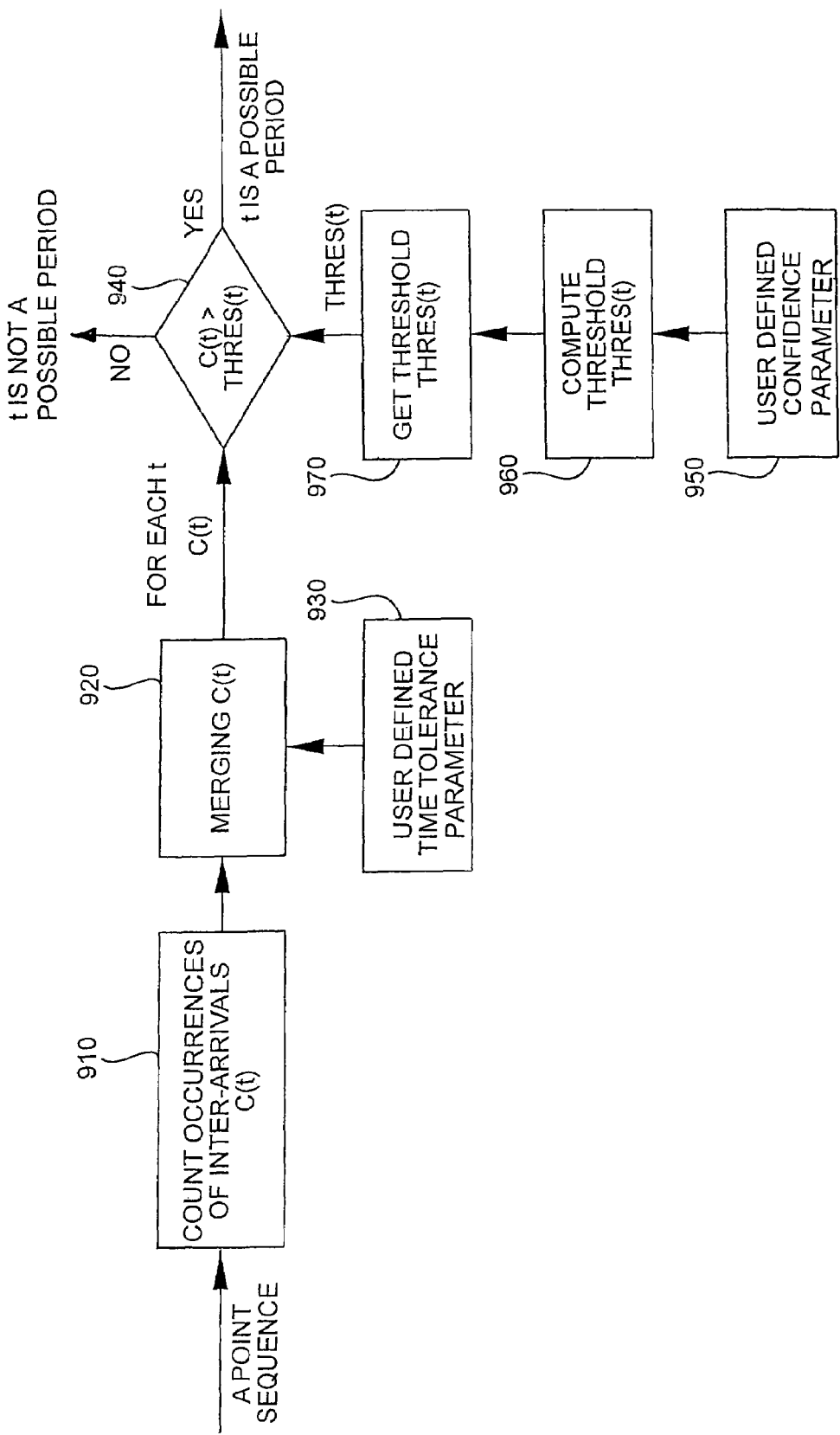
FIG. 9 is a flow diagram illustrating a process for finding periods according to an embodiment of the present invention.

Our approach is to characterize the inter-arrival times of two adjacent points, and employ a statistical test called a Chi-squared test for determining possible periods. FIG. 9 shows a process for finding periods according to such an embodiment of the invention. This algorithm counts the occurrence of each inter-arrival time, C(t), in item 710. Then, the computed counts are adjusted in item 920 to take into consideration of a possible time shift. This is accomplished by merging into a single group counts whose inter-arrival times are within a given time tolerance of one another. The time tolerance may be defined by the user in item 930. Then, for each inter-arrival, a test is performed in item 940 to determine whether its count C(t) is above a threshold thres(t). Such threshold may be generated in the following manner. In item 950, the user defines some measure of confidence with respect to the count that is application-dependent. In item 960, the threshold is computed from this confidence measure. The computation is preferably performed using a Chi-squared test, as will be illustrated below, which provides a mechanism for having a threshold that adjusts with the period under consideration. The threshold is retrieved in item 970 for use in the determination made in item 940. If the threshold is exceeded, this inter-arrival is a possible period, and is inserted into results. This procedure is repeated until all event types are processed. This procedure can be further described in the following algorithm.

Inputs: a point process: $s_i$ in S, time tolerance: $\delta$, and confident-level (e.g., 95%).

$C_\tau$ refers to the total number of arrivals with values in $[\tau-\delta, \tau+\delta]$.

/* Interval counts (item 910)*/

For i=2 to |S|
1. $\tau = s_i.\text{time} - s_{i-1}.\text{time}$
2. If $C_\tau$ does not exist, then $C_\tau = 1$
3. Else, $C_\tau = C_\tau + 1$ /*Merging counts (item 920)*/

AdjustCounts($\{C_\tau\}, \delta$)/*Adjust counts to deal with time tolerance*/

/*filtering based on test (item 940)*/

For each $\tau$ for which a $C_\tau$ exists
1. Compute threshold $C'_\tau$ based on the Chi-squared test
2. If $C_\tau > C'_\tau$, then insert $\tau$ into the set of periods being output.

In accordance with the above algorithm, the Chi-squared test may be performed as follows. The strategy here is to compare $C_\tau$ with the number of inter-arrivals in $[\tau-\delta, \tau+\delta]$ that would be expected from a random sequence of inter-arrivals. The Chi-squared statistic, as discussed in H. O. Lancaster, "The Chi-Squared Distribution," John Wiley & Sons, New York, 1969, the disclosure of which is incorporated by reference herein, may be defined for use herein as:

$$\chi_\tau^2 = \frac{(C_\tau - NP_\tau)^2}{NP_\tau(1 - P_\tau)},$$

where N is the total number of observations and $P_\tau$ is the probability of an inter-arrival falling in $[\tau-\delta, \tau+\delta]$ for a random sequence. Thus, $NP_\tau$ and $NP_\tau(1-P_\tau)$ are the expected number of occurrences and its standard deviation, respectively. $\chi_\tau^2$ is the normalized deviation from expectation. Intuitively, the Chi-squared statistic measures the degree of independence by comparing the observed occurrence with the expected occurrence under the independence assumption. A high $\chi_\tau^2$ value indicates that the number of inter-arrivals close to $\tau$ cannot be explained by randomness, which is a necessary condition for periodicity.

$\chi^2$ is usually defined in terms of a confidence level. For example, 95% confidence level leads to $\chi^2=3.84$(n=1, $\alpha=0.05$). Then, the above equation can be changed to $$C'_\tau = \sqrt{3.84 NP_\tau(1-P_\tau)} + NP_\tau.$$

$C'_\tau$ can be used as a threshold to find possible periods. That is, we say that $\tau$ is a possible period, if:

$$C_\tau > C'_\tau.$$

To compute $P_\tau$, we note that a random event sequence approaches a Poisson arrival sequence (as discussed in S. M. Ross, "Introduction to Probability and Statistics for Engineers and Scientists," John Wiley & Sons, New York, 1987) as the number of points increases. Further, it is well known that the inter-arrival times of a Poisson process are exponentially distributed. Using this, we obtain:

$$P_\tau = \int_{p-\delta}^{p+\delta} \lambda \exp(-\lambda t)\, dt,$$
$$\approx 2\delta\lambda\exp(-\lambda p),$$

where $\lambda = N/T$ is the mean arrival. The approximation is obtained based on the assumption that $\delta/p$ is small.

Figure 10:
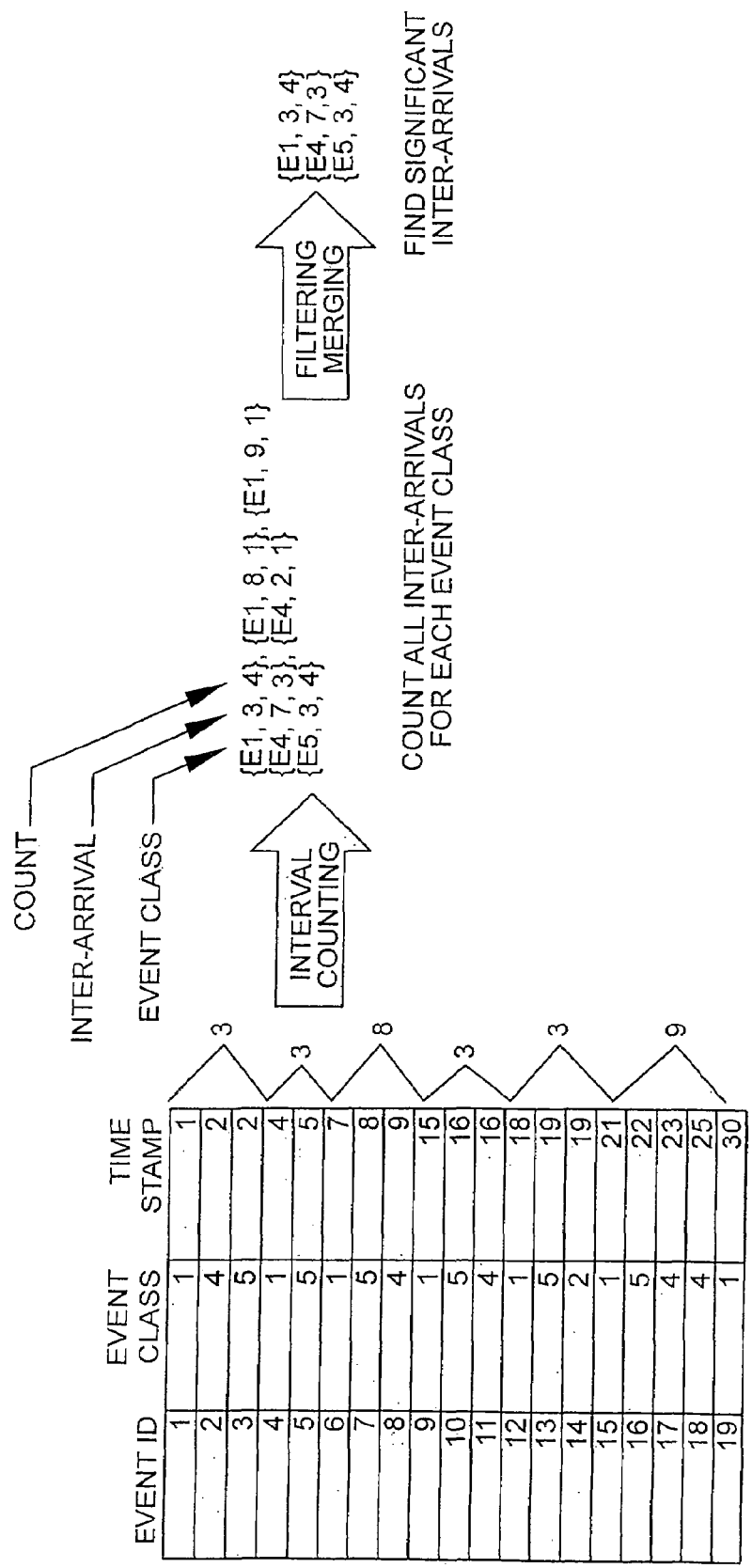
FIG. 10 is a diagram illustrating the algorithm of FIG. 9 using a working example.

FIG. 10 illustrates the above algorithm for the working example. As illustrated, inter-arrivals for each event class are first computed and counted. Here, {E1, 3, 4} means that event class E1 has 4 occurrences of interval 3. Then, the results are filtered and merged. For example, {E1, 8, 1} is filtered out because of a low count.

Figure 11:
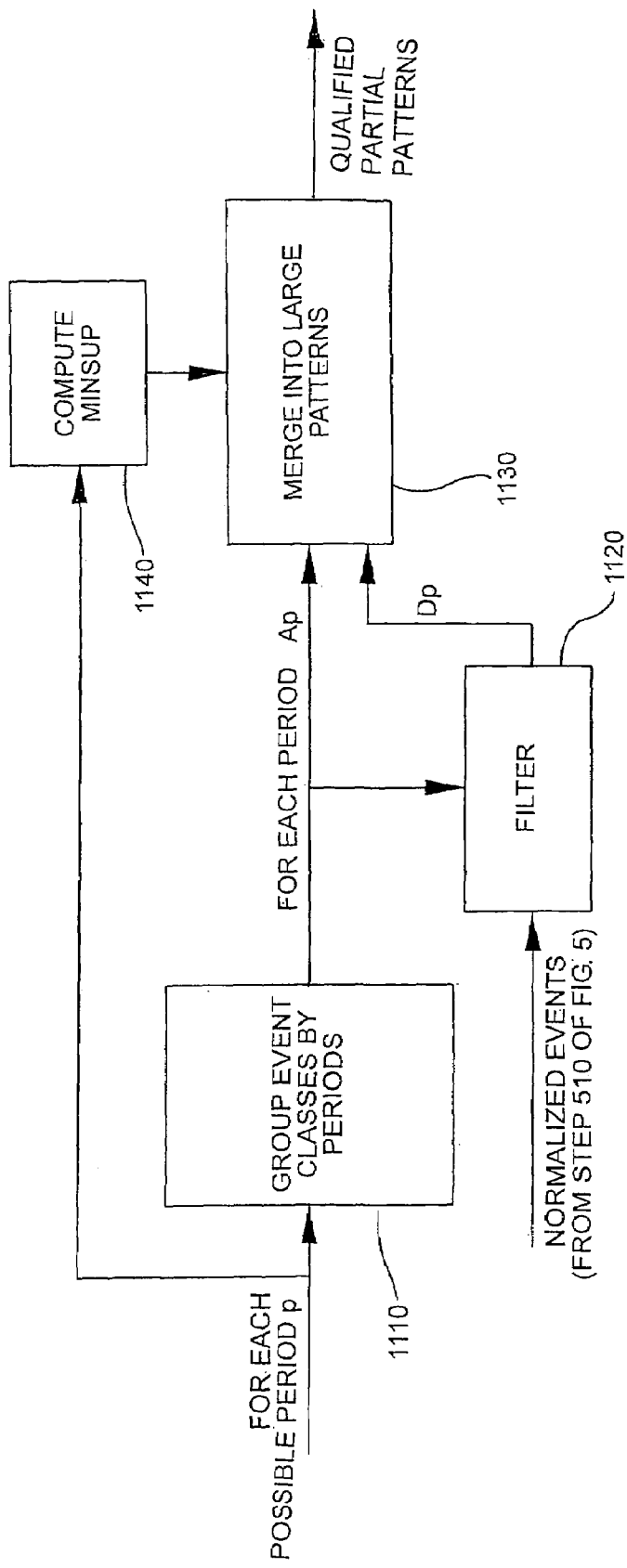
FIG. 11 is a flow diagram illustrating a process for finding patterns for each period length according to an embodiment of the present invention.

Now, we discuss how to find p-patterns given a set of possible periods found, i.e., item 530 of FIG. 5. FIG. 11 illustrates a process for finding patterns for each period length according to an embodiment of the invention. The algorithm preferably includes three steps. First, item 1110 finds all event classes that have period length p denoted as $A_p$. Second, item 1120 filters the normalized events based on $A_p$. In this way, we only need to further process those events related to the period under the consideration. Lastly, item 1130 merges event classes into a pattern. Item 1140 computes the minimum support minsup that is used by item 1130. The minimum support can be set differently for each period length. It is usually reversibly proportional to the length of a period.

Figure 12:
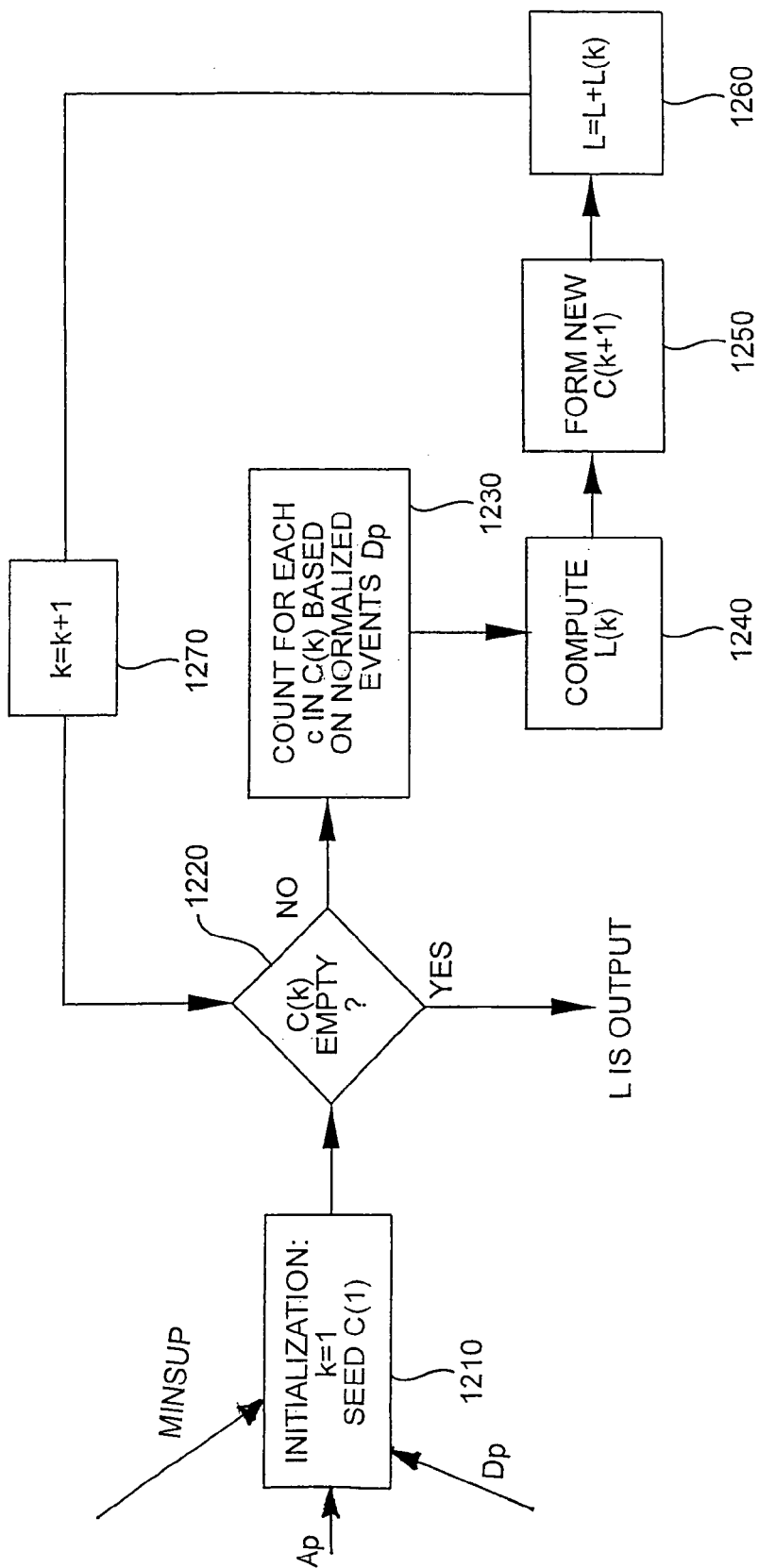
FIG. 12 is a flow diagram illustrating a process for merging patterns according to an embodiment of the present invention.

FIG. 12 illustrates the merging process in item 1130 of FIG. 11. The inputs to the process include period length p; filtered normalized events $D_p$; $A_p$ computed in item 1110 of FIG. 11; and minimum support minsup computed in item 1140 of FIG. 11. The process outputs a set of p-patterns with period p in L. In particular, item 1210 initializes the process. This includes: setting k=1; clearing the output L; seeding C(l) by A. C(k) represents a set of candidate p-patterns with length k. Thus, C(l) is a set of candidate p-patterns with length l. Item 1220 tests whether C(k) is empty. If C(k) is empty, the process terminates and outputs L. Otherwise, item 1230 counts the occurrences (instances) in $D_p$ for every candidate in C(k). An instance at time t of a pattern in $D_p$ should satisfy two conditions. First, all event classes of the p-pattern occur within the tolerant time interval around t. This ensures that this instance is temporal associated. Second, all event classes occur within the tolerant time interval around t-p. This ensures the periodicity with length p. Item 1240 constructs a set of qualified p-patterns. A qualified p-pattern is the one in C(k) whose support (i.e., count) is bigger than the minimum support. Item 1250 constructs a set of candidate p-patterns for the next level. This step can be done by a joint operation followed by pruning as proposed by R. Agrawal et al., "Mining association rules between sets of items in large databases," Proc. of VLDB, pp. 207–216, 1993, the disclosure of which is incorporated by reference herein. Item 1260 adds L(k) into L. Lastly, item 1270 increments k and goes back for the next level.

Figure 13:
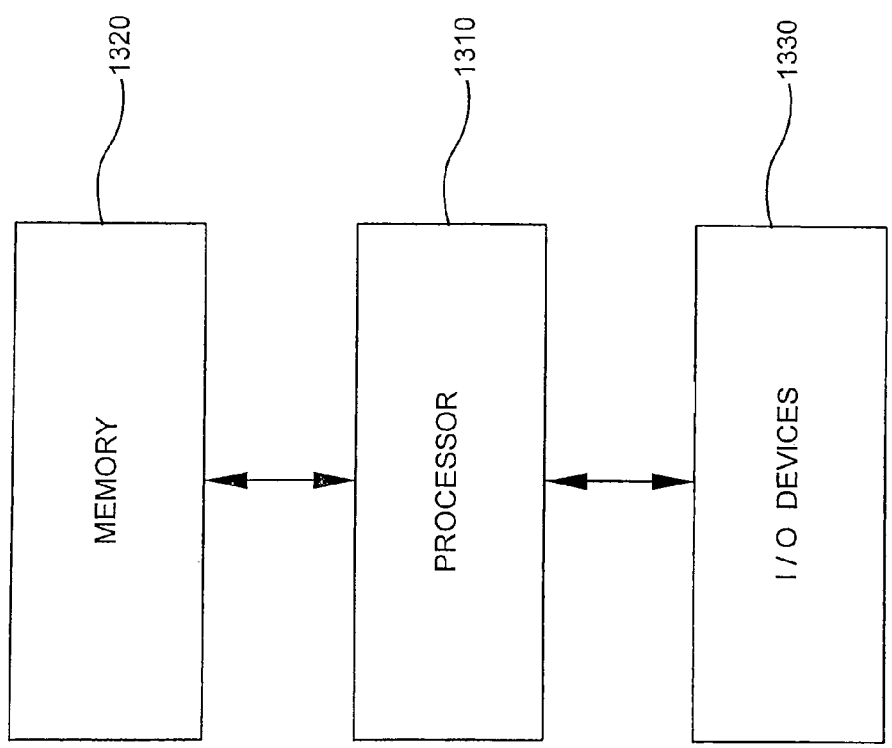
FIG. 13 is a block diagram illustrating a generalized hardware architecture of a computer system suitable for implementing a system for discovering partially periodic patterns according to the present invention.

Referring now to FIG. 13, a block diagram is shown illustrating a generalized hardware architecture of a computer system suitable for implementing the various functional components/modules of a system for discovering partially periodic patterns or p-patterns as depicted in the figures and explained in detail herein. It is to be understood that the individual components of the pattern mining system, e.g., as illustrated in FIG. 3, may be implemented on one such computer system, or on more than one separate such computer system. Also, individual components of the system may be implemented on separate such computer systems. It is to be appreciated that the user (e.g., 370 in FIG. 3) may interact directly with the one or more computer systems implementing the pattern mining system 300. Alternatively, the user may employ a computer system in communication (e.g., via a remote or local network) with the one or more computer systems implementing the system 300 in order to interact with the system 300.

As shown, the computer system may be implemented in accordance with a processor 1310, a memory 1320 and I/O devices 1330. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, mouse, etc., for entering data (e.g., user commands, constraints, parameters, etc.) to the processing unit, and/or one or more output devices, e.g., CRT display, printer, etc., for presenting results (e.g., view lists, pattern visualizations, etc.) associated with the processing unit. For example, system user interfaces employed by the user may be realized through such I/O devices. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-based method of discovering one or more partially periodic patterns in event data, the method comprising the steps of:
   transforming at least a portion of the event data into event classes such that the event data is non-application-dependent;
   determining period lengths for each event class in accordance with occurrences of events in the transformed event data, wherein determination of the period lengths for each event class takes into account a predetermined time tolerance value; and
   merging event classes into one or more temporally associated groups in accordance with the period lengths to form the one or more partially periodic patterns,
   wherein the one or more partially periodic patterns are utilizable in accordance with an application domain associated with the event data.

2. The method of claim 1, wherein the event data transformation step further comprises the step of mapping two or more attributes associated with an event into an event class.

3. The method of claim 2, wherein the mapping step is performed in accordance with a lookup table.

4. The method of claim 1, wherein the event data is in a tabular form with a first number of columns before the transformation step and in a tabular form with a second number of columns after the transformation step, the second number of columns being less than the first number of columns.

5. The method of claim 1, wherein the period length determination step further comprises the steps of:
   generating counts of inter-arrival times between adjacent events in the event data;
   merging the counts based on the predetermined time tolerance value; and
   testing the statistical significance of the merged counts in order to determine the period lengths.

6. The method of claim 5, wherein the statistical significance testing step further comprises the use of a Chi-squared test.

7. The method of claim 1, wherein the event class merging step further comprises the steps of:
   filtering events based on the determined period lengths;
   setting up a threshold based on the determined period lengths for a level-wise search of the event data so as to find the one or more partially periodic patterns; and
   grouping the event classes by period length so as to set an initial candidate set for the level-wise search.

8. Apparatus for discovering one or more partially periodic patterns in event data, the apparatus comprising:
   at least one processor operative to: (i) transform at least a portion of the event data into event classes such that the event data is non-application-dependent; (ii) determine period lengths for each event class in accordance with occurrences of events in the transformed event data, wherein determination of the period lengths for each event class takes into account a predetermined time tolerance value; and (iii) merge event classes into one or more temporally associated groups in accordance with the period lengths to form the one or more partially periodic patterns, wherein the one or more partially periodic patterns are utilizable in accordance with an application domain associated with the event data; and
   a memory, coupled to the at least one processor, which stores at least one of the event data, the transformed event data, and the one or more partially periodic patterns.

9. The apparatus of claim 8, wherein the event data transformation operation further comprises mapping two or more attributes associated with an event into an event class.

10. The apparatus of claim 9, wherein the mapping operation is performed in accordance with a lookup table.

11. The apparatus of claim 8, wherein the event data is in a tabular form with a first number of columns before the transformation step and in a tabular form with a second number of columns after the transformation step, the second number of columns being less than the first number of columns.

12. The apparatus of claim 8, wherein the period length determination operation further comprises: (i) generating counts of inter-arrival times between adjacent events in the event data; (ii) merging the counts based on the predetermined time tolerance value; and (iii) testing the statistical significance of the merged counts in order to determine the period lengths.

13. The apparatus of claim 12, wherein the statistical significance testing operation further comprises the use of a Chi-squared test.

14. The apparatus of claim 8, wherein the event class merging operation further comprises: (i) filtering events based on the determined period lengths; (ii) setting up a threshold based on the determined period lengths for a level-wise search of the event data so as to find the one or more partially periodic patterns; and (iii) grouping the event classes by period length so as to set an initial candidate set for the level-wise search.

15. An article of manufacture for discovering one or more partially periodic patterns in event data, the article comprising a machine readable medium containing one or more programs which when executed implement the steps of:

transforming at least a portion of the event data into event classes such that the event data is non-application-dependent;

determining period lengths for each event class in accordance with occurrences of events in the transformed event data, wherein determination of the period lengths for each event class takes into account a predetermined time tolerance value; and merging event classes into one or more temporally associated groups in accordance with the period lengths to form the one or more partially periodic patterns, wherein the one or more partially periodic patterns are utilizable in accordance with an application domain associated with the event data.

16. The article of claim 15, wherein the event data transformation step further comprises the step of mapping two or more attributes associated with an event into an event class.

17. The article of claim 16, wherein the mapping step is performed in accordance with a lookup table.

18. The article of claim 15, wherein the event data is in a tabular form with a first number of columns before the transformation step and in a tabular form with a second number of columns after the transformation step, the second number of columns being less than the first number of columns.

19. The article of claim 15, wherein the period length determination step further comprises the steps of:

generating counts of inter-arrival times between adjacent events in the event data;

merging the counts based on the predetermined time tolerance value; and testing the statistical significance of the merged counts in order to determine the period lengths.

20. The article of claim 19, wherein the statistical significance testing step further comprises the use of a Chi-squared test.

21. The article of claim 15, wherein the event class merging step further comprises the steps of:

filtering events based on the determined period lengths;

setting up a threshold based on the determined period lengths for a level-wise search of the event data so as to find the one or more partially periodic patterns; and grouping the event classes by period length so as to set an initial candidate set for the level-wise search.

* * * * *

UNITED STATES PATENT AND TRADEMARK OFFICE
CERTIFICATE OF CORRECTION

PATENT NO. : 6,996,551 B2
APPLICATION NO. : 09/739432
DATED : February 7, 2006
INVENTOR(S) : J.L. Hellerstein et al.

It is certified that error appears in the above-identified patent and that said Letters Patent is hereby corrected as shown below:

Col. 10, line 46, delete "710" and insert --910--

Col. 11, line 55, delete " $C'_\tau = \overline{3.84NP_\tau(1-P_\tau)+NP_\tau}$ "

and insert -- $C'_\tau = \sqrt{\{\text{square root over } (3.84NP_\tau(1-P_\tau))\}} + NP_\tau.$ --

Signed and Sealed this

Tenth Day of October, 2006

JON W. DUDAS
*Director of the United States Patent and Trademark Office*

UNITED STATES PATENT AND TRADEMARK OFFICE
CERTIFICATE OF CORRECTION

PATENT NO.       : 6,996,551 B2                                           Page 1 of 1
APPLICATION NO.  : 09/739432
DATED            : February 7, 2006
INVENTOR(S)      : J.L. Hellerstein et al.

It is certified that error appears in the above-identified patent and that said Letters Patent is hereby corrected as shown below:

Col. 10, line 46, delete "710" and insert --910--

Col. 11, line 55, delete " $C'_r = \overline{3.84NP_r(1-P_r)} + NP_r$ "

and insert -- $C'_r = \sqrt{3.84NP_r(1-P_r)} + NP_r$ --

This certificate supersedes Certificate of Correction issued October 10, 2006.

Signed and Sealed this

Thirteenth Day of March, 2007

JON W. DUDAS
*Director of the United States Patent and Trademark Office*